US010038751B2

(12) United States Patent
Corbin

(10) Patent No.: US 10,038,751 B2
(45) Date of Patent: Jul. 31, 2018

(54) SENSOR SYSTEM

(71) Applicant: DORO AB, Lund (SE)

(72) Inventor: Xavier Corbin, Chevreuse (FR)

(73) Assignee: Doro AB, Lund (SE)

( * ) Notice: Subject to any disclaimer, the term of this patent is extended or adjusted under 35 U.S.C. 154(b) by 264 days.

(21) Appl. No.: 14/774,980

(22) PCT Filed: Mar. 14, 2014

(86) PCT No.: PCT/EP2014/055175
§ 371 (c)(1),
(2) Date: Sep. 11, 2015

(87) PCT Pub. No.: WO2014/140319
PCT Pub. Date: Sep. 18, 2014

(65) Prior Publication Data
US 2016/0028825 A1 Jan. 28, 2016

(30) Foreign Application Priority Data

Mar. 15, 2013 (EP) ..................................... 13290061

(51) Int. Cl.
*G01P 15/00* (2006.01)
*H04L 29/08* (2006.01)
(Continued)

(52) U.S. Cl.
CPC .............. *H04L 67/12* (2013.01); *G01P 15/00* (2013.01); *G08B 21/0469* (2013.01);
(Continued)

(58) Field of Classification Search
CPC ..................................................... H04L 67/12
See application file for complete search history.

(56) References Cited

U.S. PATENT DOCUMENTS 6,002,994 A    12/1999   Lane et al.
7,113,090 B1    9/2006   Saylor et al.
(Continued)

FOREIGN PATENT DOCUMENTS

EP         2431955 A2     3/2012
WO      WO 97/00415      1/1997
(Continued)

OTHER PUBLICATIONS

International Search Report for International Application No. PCT/EP2014/052952 dated May 16, 2014 (2 pages).
(Continued)

*Primary Examiner* — Phuong Hyunh
(74) *Attorney, Agent, or Firm* — Merchant & Gould P.C.

(57) ABSTRACT

A sensor system (200) comprises a plurality of sensors (110) and a system server (120), all of said plurality of sensors (110) being of a same accelerometer-based sensor type. Each of said plurality of sensors is adapted for attachment to a respective movable structure (112) in a building. Each of said plurality of sensors (110) is individually configured to detect a respective basic movement (114) of said movable structure (112), wherein said basic movement is indicative of a human behavioral action (116) in said building. Each of said plurality of sensors (110) is arranged to detect its basic movement and communicate with said system server in response to detecting the basic movement. The system server (120) is configured to receive a detection signal (118) from any of said plurality of sensors (110), determine an activity pattern (124) based on said detection signal, determine an appropriate function (126) based on said activity pattern and, execute said function.

15 Claims, 7 Drawing Sheets

(51) Int. Cl.
*G06F 11/30* (2006.01)
*G08B 13/00* (2006.01)
*G08B 21/04* (2006.01)

(52) U.S. Cl.
CPC .......... *G08B 13/00* (2013.01); *G08B 21/0415* (2013.01); *G08B 21/0446* (2013.01)

(56) References Cited

U.S. PATENT DOCUMENTS

2004/0066302 A1* 4/2004 Menard .............. G08B 13/1436
340/669
2006/0055543 A1* 3/2006 Ganesh .............. G08B 21/0423
340/573.1
2010/0302041 A1 12/2010 Malik et al.

FOREIGN PATENT DOCUMENTS

| WO | WO 02/01124 | 1/2002 |
| WO | WO 2005/054758 | 6/2005 |
| WO | WO 2009/062738 | 5/2009 |

OTHER PUBLICATIONS

Communication for European Patent Application No. 13181268.7, dated Sep. 28, 2017 but sent by facsimile on Sep. 21, 2017.

\* cited by examiner

| 110 Sensor ID | Timing | 124 Activity pattern |
|---|---|---|
| a | - | 1 |
| b, c | - | 2 |
| d | Absolute time range | 3 |
| e, f | - | 4 |
| g, h | Relative time range | 5 |
| ... | ... | ... |
| m | - | p |

Fig 3

| 124 Activity pattern | 126 Function |
|---|---|
| 1 | 1 |
| 2 | 1, 2 |
| 3 | 3 |
| 4 | 3 |
| ... | ... |
| p | q |

Fig 4

SENSOR SYSTEM

This application is a National Stage Application of PCT/EP2014/055175, filed 14 Mar. 2014, which claims benefit of Serial No. 13290061.4, filed 15 Mar. 2013 in Europe and which applications are incorporated herein by reference. To the extent appropriate, a claim of priority is made to each of the above disclosed applications.

TECHNICAL FIELD

This application relates to a sensor system and associated methods for behavioural monitoring.

BACKGROUND

In today's society there exist many different monitoring systems which based on an array of different sensor identify an appropriate function to execute based on the received sensor signals.

For instance, the U.S. Pat. No. 6,002,994 discloses a system where a plurality of different types of sensors is used. Examples are motion sensors, magnetic sensors, infrared sensors to name a few.

This system suffers from that the different sensors need to be mounted or installed in different manners depending on the sensor type. They may also require an accurate and possibly complicated installation to make sure they are properly aligned. They are thus not suitable to be installed by a layperson, and professional installation increases the price of the system often making it unavailable to a broader public.

There is thus a need for a system that is easy to install, simple to set up while still being flexible and cost-efficient.

SUMMARY

It is an object of the teachings of this application to overcome one or more of the problems listed above by providing a sensor system comprising a plurality of sensors and a system server, wherein all of said plurality of sensors are of a same accelerometer-based sensor type, each of said plurality of sensors being adapted for attachment to a respective movable structure in a building. Each of said plurality of sensors is individually configured to detect a respective basic movement of said movable structure, wherein said basic movement is indicative of a human behavioural action in said building. Each of said sensors is arranged to detect its basic movement and communicate with said system server in response to detecting the basic movement. The system server is configured to receive a detection signal from any of said plurality of sensors, determine an activity pattern based on said detection signal, determine an appropriate function based on said activity pattern, and execute said function.

The inventor of the present invention has realized, after inventive and insightful reasoning, that by using sensors of a simple type and of only one type, attaching them to different movable structures in a building and configuring them to detect respective basic movements of the movable structures, a flexible sensor system for monitoring of human behaviour is provided. This is rendered possible by the understanding that human behavioural actions are at least indirectly associated with movements of movable structures in a building. The use of movement sensors, being of an accelerometer type, further enables the sensors to be easy to install, requiring no complicated alignment.

Contrary to the prior art where a special sensor is dedicated to detecting a specific action, the sensor system according to herein utilize one and the same type of sensor for detecting all sorts of actions, thereby reducing the complexity of the installation, the cost of the system (as only one type of sensor needs to be manufactured and stocked) and the maintenance and repair of the system, as an easily installed sensor is also easily replaced. The system is also highly flexible, as one and the same kit can be used for many different purposes depending simply on the placement of the sensor. Hence, a flexible and cost-efficient sensor system is obtained.

It should be noted that a sensor system according to the teachings herein may be combined with a prior art system. In such a system there may be a plurality of first sensors of a first type, and at least one second sensor of a second type, wherein the system server is configured to receive a detection signal from said second-type sensor and to use it when determining said appropriate function. Such a system at least partially benefits from the advantages of a system according to this invention.

It is a further object of the teachings of this application to provide a method of configuring a sensor system for behavioural monitoring of a user in a building, wherein the method involves providing a plurality of sensors, all of said plurality of sensors being of a same accelerometer-based sensor type, and attaching each of said plurality of sensors to a respective movable structure in said building. The method further involves configuring each of said plurality of sensors individually to detect a respective basic movement of said movable structure, said basic movement being indicative of a human behavioural action in said building. The method further involves providing a system server and defining for said system server a plurality of activity patterns, each activity pattern being based on a detection signal from one or more of said plurality of sensors, and a plurality of executable functions, each function pertaining to assistance, attendance, care taking, medical care, emergency service or rescue of a human user in said building. The system server also defines a mapping between activity patterns and executable functions.

It is a further object of the teachings of this application to provide a method of monitoring of a user in a building using a sensor system having been configured according to the above. The method involves receiving, by the system server, one or more detection signals from one or more of said plurality of sensors. The method further involves determining an activity pattern among said plurality of activity patterns based on said detection signal or detection signals, and determining an appropriate function among said plurality of executable functions based on the determined activity pattern. The method further involves executing the determined appropriate function.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail with reference to the accompanying drawings, in which:

FIG. 3 shows a data structure which may be used in a sensor system according to one embodiment;

FIG. 4 shows a data structure which may be used in a sensor system according to one embodiment;

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
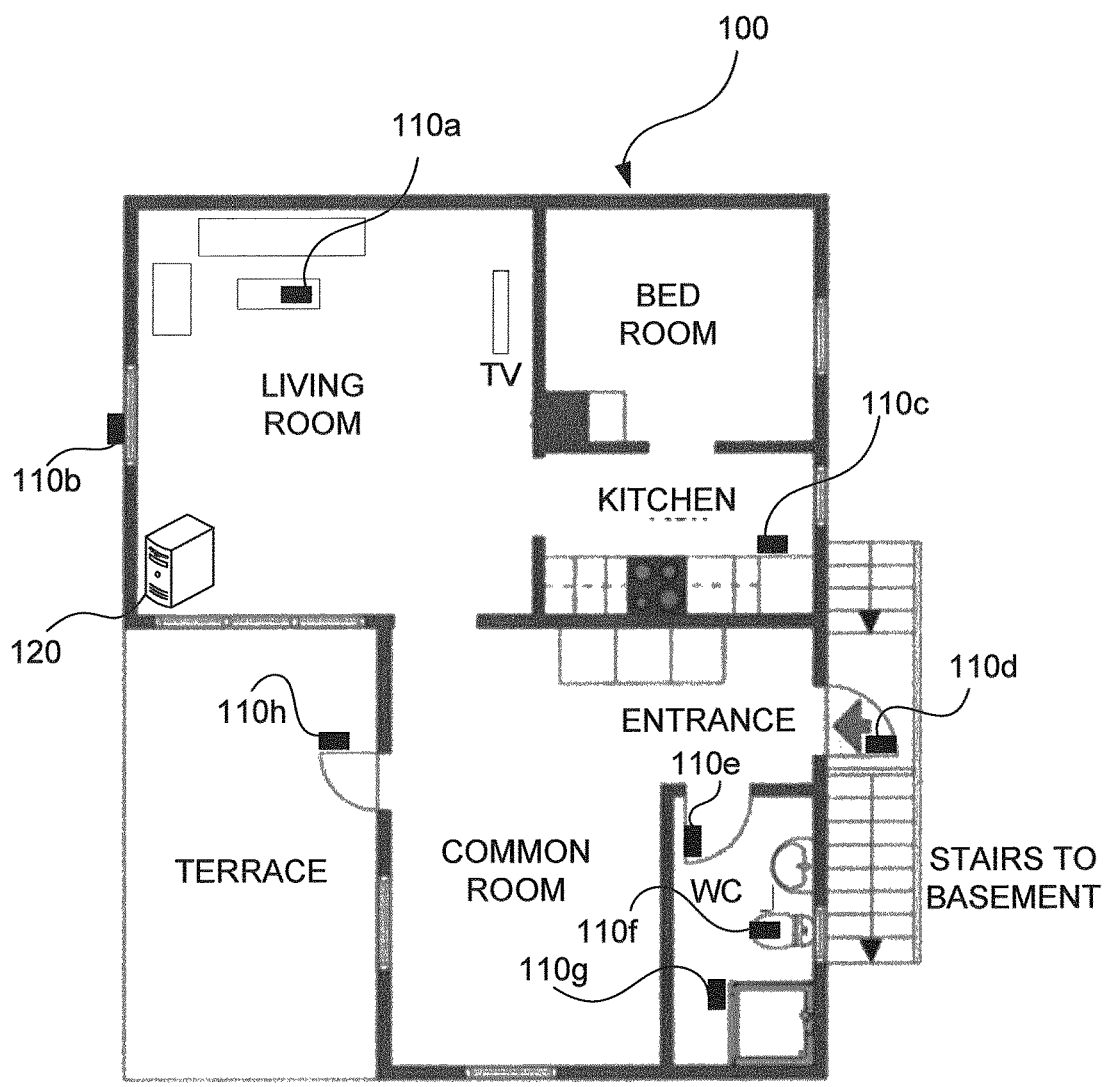
FIG. 1 shows a schematic view of a building arranged with a sensor system according to one embodiment.

FIG. 1 shows an example of a building 100, in this example a house, which is arranged with a sensor system (referenced 200 in FIGS. 2 and 5) according to an embodiment.

The house has different rooms, such as a kitchen, a bed room, a bathroom (referenced WC in FIG. 1). The house is also arranged with a set of stairs leading down to a basement. The description of this application will be focused on a few rooms, but it should be noted that the same or similar functions of the sensor system may be applied also to the other rooms (and also further to other rooms in other building types).

The sensor system is comprised of a system server 120 and a number of sensors 110a-h. In the example of FIG. 1 there are 8 sensors 110a-h, but the number of sensors used depends on the building structure and the wanted functionality as a skilled person would realize.

The sensors 110 (described in detail with reference to FIG. 6) are of a simple and same type to enable easy selection of which sensor to place where. As all sensors are of the same type, no special considerations or knowledge is required by a user installing the sensor system. The sensors 110 are movement sensors 110, and more specifically accelerometer-based movement sensors. The use of accelerometer-based movement sensors has the benefit that they are easy to install. The installation requires no alignment of different components (such as magnets and magnetic detectors, or light emitters, reflectors and detectors) and can easily be made by a layman. A sensor 110 may simply be attached to a movable structure 112, such as a door, a window, a lever (or similar), a hatch or an object in the building. The appropriate attachment depends on the structure that the sensor 110 is to be attached to. For example, attaching the sensor 110 to a door may be accomplished using screws, nails, adhesives or simply taping the sensor 110 to the door, while attaching the sensor 110 to a remote control or a pill organiser may be accomplished using adhesives or simply taping.

Figure 2:
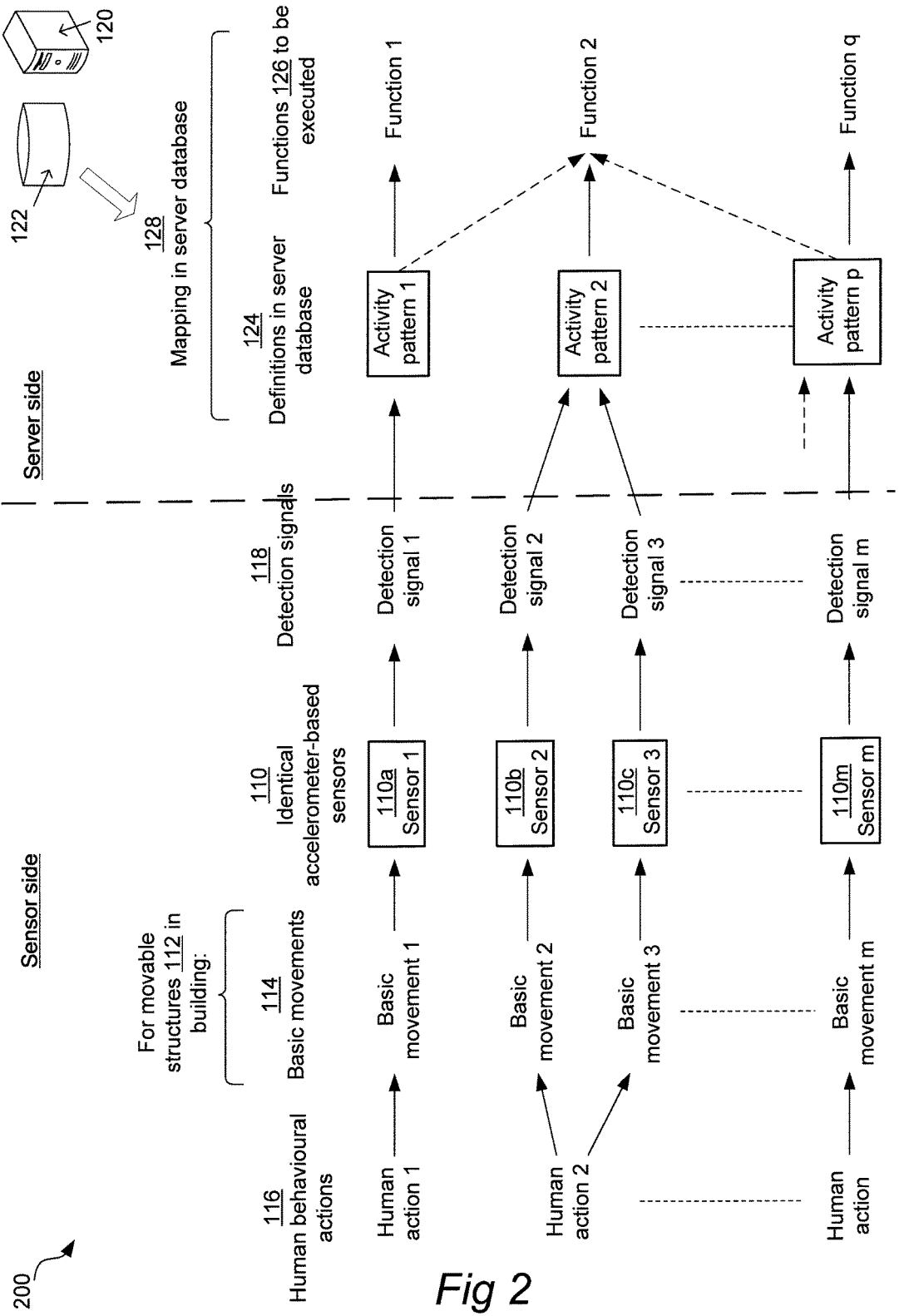
FIG. 2 shows a schematic view of the general structure of a sensor system according to one embodiment.

Reference is now made particularly to FIG. 2. One particularly beneficial feature of this invention lies in the realisation that an elegantly simple solution is provided by detecting a human behavioural action 116 indirectly. When configuring the system, an action 116 is analysed to find a basic movement 114 associated with the action. The action may not normally be considered to be associated with a movement 114, but most actions 116 are at least indirectly associated with a movement 114. Some examples are given below.

Making a successful toilet visit (the action) is associated with a flushing of the toilet, which is associated with the movement of pulling a flushing lever or handle. Hence, the action of a successful toilet visit is associated with a movement of the flush lever.

Making sure (or at least at a high likelihood) that someone is eating (the action) is associated with fetching food, which is associated with opening a cabinet or refrigerator door (the movement).

Making sure (or at least at a high likelihood) that someone is taking their medication (the action) is associated with getting medication pills from a pill organiser which is associated with moving the pill organiser (the movement).

To enable the association between a sensor 110 and an appropriate function 126 to execute if a human behavioural action 116 occurs, the system server 120 is configured to maintain a record or register 122, 124, 128 over the sensors 110a-h and associated functions 126 to be taken. The record or register 122, 124, 128 may be stored in a memory (referenced 440 in FIG. 7) of the system server 120, wherein the memory 440 contains a database 122. This be explained in more detail with reference to FIGS. 2-4.

As a sensor 110 is introduced or added to the sensor system, such as when installing the sensor system, an identifier for the sensor is registered in the record or register 122, 124, 128 along with an associated function 126 that should be taken. The identifier may be provided by the sensor 110 to the system server 120, or it may be assigned by the system server 120 to the sensor 110.

A human behavioural action 116 is thus associated with a basic movement 114 of a movable structure 112. A sensor 110 detects the basic movement, and therefore indirectly the human behavioural action 116. The sensor 110 generates a detection signal 118 which is also associated with a function 126 through an association referred to as activity pattern 124. The appropriate function 126 to execute may depend on the room in which the sensor 110 is arranged, and the movable structure 112 (such as door entrance, refrigerator door, balcony door, window, remote control, a lever, a pill organiser, a drawer and a hatch) to which it is attached. The system server may be arranged with a list (at least partially pre-stored or at least partially fetched from a remote service provider) over possible functions 126 that a sensor 110 can be associated with. The exact functionality of such a function 126 depends on the system implementation and an extensive or complete list of possible functions would be too exhausting to be practical in a patent application. However, some examples are given of the basic functionality of appropriate functions 126 for associated human behavioural actions 116.

Sensor 110a arranged on a remote control—indicates active inhabitant (action 116); the function 126 may simply be a recording of current well-being for a senior citizen or handicapped person in the building.

Sensor 110b arranged on window in living room—indicates potential health risk for a disordered person if occurring during night or winter, or break in if at awkward time; the function 126 may be an alert to a care giving service or an alarm to an emergency service.

Sensor 110c arranged on refrigerator door—indicates eating pattern/habit.

Sensor 110d arranged on entrance door—indicates leaving/entering building or possible break in if at awkward time.

Sensor 110e arranged on toilet door—indicates possible toilet visit or hygiene.

Sensor 110f arranged on flush lever—indicates toilet visit.

Sensor 110g arranged on door to shower (or shower handle)—indicates hygienic activity.

Sensor 110h arranged on terrace door—indicates possible hypothermia if not closed soon.

As can be seen from the placement of the sensor 110e compared with the placement of the sensors 110f and 110g, the sensor arrangement may be configured as a compromise between the necessity of control/monitoring and the personal integrity of a user or inhabitant. Such decisions on how to arrange a sensor 110 can be taken by the person installing the system based on the needs of the inhabitant.

FIG. 2 shows a schematic view of the general structure of a sensor system 200 according to one embodiment. The sensor system 200 can be described as comprising a sensor side and a server side. At the sensor side of the sensor system 200, a human behavioural action 116 is indirectly detected by detecting one or more basic movement(s) 114. Each of the plurality of identical accelerometer-based sensors 110a-m is adapted for attachment to a respective movable structure 112 in a building. Each of the sensors 110a-m is individually configured to detect a respective predetermined basic movement 114 of the movable structure 112, to which the sensor is attached. To enable this detection, each sensor 110a-m may be configured to store a definition of a movement pattern for the basic movement 114 to be detected. Each of the sensors 110a-m transmits a detection signal 118 to the system server 120 upon detection of the basic movement 114 of the movable structure 112.

At the server side of the sensor system 200, a detection signal 118 is received from any of the plurality of sensors 110. The system server 120 is configured to define a plurality of activity patterns 124, where each activity pattern is based on a detection signal 118 from one or more of the plurality of sensors 110. The system server 120 is further configured to define a plurality of executable functions 126. The activity patterns 124 and the executable functions 126 are then mapped together in the server database 122, as seen at 128.

FIGS. 3 and 4 exemplify data structures which may be used by the system server 120. The system server 120 is configured to determine activity patterns 124 based on received detection signals 118 from the plurality of sensors 110 to determine an appropriate function 126 to execute. An activity pattern 124 may be based on a single, detection signal 118 from a specific sensor among the plurality of sensors 110. The system server 120 may also be configured to combine detection signals 118 from two or more sensors 110 to determine an appropriate function 126 to execute, wherein the combination of detection signals 118 constitutes an activity pattern 124. Hence, an activity pattern 124 may be based on one or more detections signals 118 from one or more sensors 110. The may be a one-to-one relation, a one-to-many relation or a many-to-one relation between activity pattern 124 and function 126, as is apparent from the present description and FIGS. 2-4.

For example, if a detection signal 118 from a toilet door sensor 110e is received shortly after a detection signal 118 is received from a flush lever sensor 110f, this may indicate that a person has had a successful toilet visit. Thus, an activity pattern may be defined as the receipt of the detection signal from the flush lever sensor 110f followed by the receipt of the detection signal from the toilet door sensor 110e, preferably within a certain timing threshold to enhance the likelihood that this combined activity pattern is correctly interpreted as the result of a successful toilet visit action 116. An appropriate function 126 to execute may be a log file entry in a monitoring system run by a care giver service.

Another example is that a series of received detection signals 118 from a refrigerator sensor 110c and a cupboard sensor (not shown) indicates an active food preparation.

The system server 120 may thus be configured to determine an appropriate function 126 based on a timing of a received detection signal, of a series of received detection signals, of a combination of detection signals and/or a series of a combination of detection signals 118, wherein the timing (referred to as Timing in FIG. 3) is part of the activity pattern 124. The timing may be an absolute time range (e.g. between certain times of day) and/or a relative time range (e.g. the second detection signal is received within a threshold time from the first detection signal). For example, if no detection signal 118 is received for a prolonged time during a time of day at which an inhabitant of the house 100 would be assumed to be active, this may indicate that the inhabitant is incapacitated in some manner and that an appropriate function 126 is required such that alerting a relative, an assistance service, an emergency service, a care taking service, a medical care service or a rescue service or any combinations thereof.

Other examples of activity patterns 124 are for example repeated reception of a number of detection signals 118 from a toilet flush sensor 110f, which indicates repeated flushing which may in turn indicate that something is wrong. The inhabitant may be physically sick, the inhabitant may suffer from dementia or the toilet may be out of order. Another example of a combination activity pattern 124 is alternating reception of detection signals 118 from a refrigerator sensor 110c and a toilet sensor 110e or 110f, which also may indicate that the inhabitant is experiencing problems, either physically or mentally. Again, an appropriate function may involve alerting a relative, an assistance service, an emergency service, a care taking service, a medical care service or a rescue service, or any combinations thereof.

The system server may also be configured to determine a severity of an activity pattern 124 and prioritise which functions should be taken based on the priority. For example, should a signal be received from the refrigerator sensor 110c, indicating that the refrigerator 110c is opened, and the detection signal 118 is not followed by a further detection signal 118 from the refrigerator sensor 110c within a time period, indicating that the refrigerator is not closed, while also receiving a detection signal 118 from the shower door sensor 110g and the detection signal 118 is not followed by a detection signal from the toilet door sensor 110e within a time period, probably indicating a fall on the slippery floor, the latter action has more severe consequences and should be treated as a higher priority action. The associated function 126 to issue an alarm to an emergency service would therefore be executed before the action 116 associated with a not closed refrigerator—to alert a care taking service for sending someone or making a call to the house to make sure that the refrigerator door is closed.

It should be noted that even though the description herein focuses on a sensor system 200 being installed in a house, it should be noted that similar systems may also be arranged in other types of buildings or environments.

Figure 5:
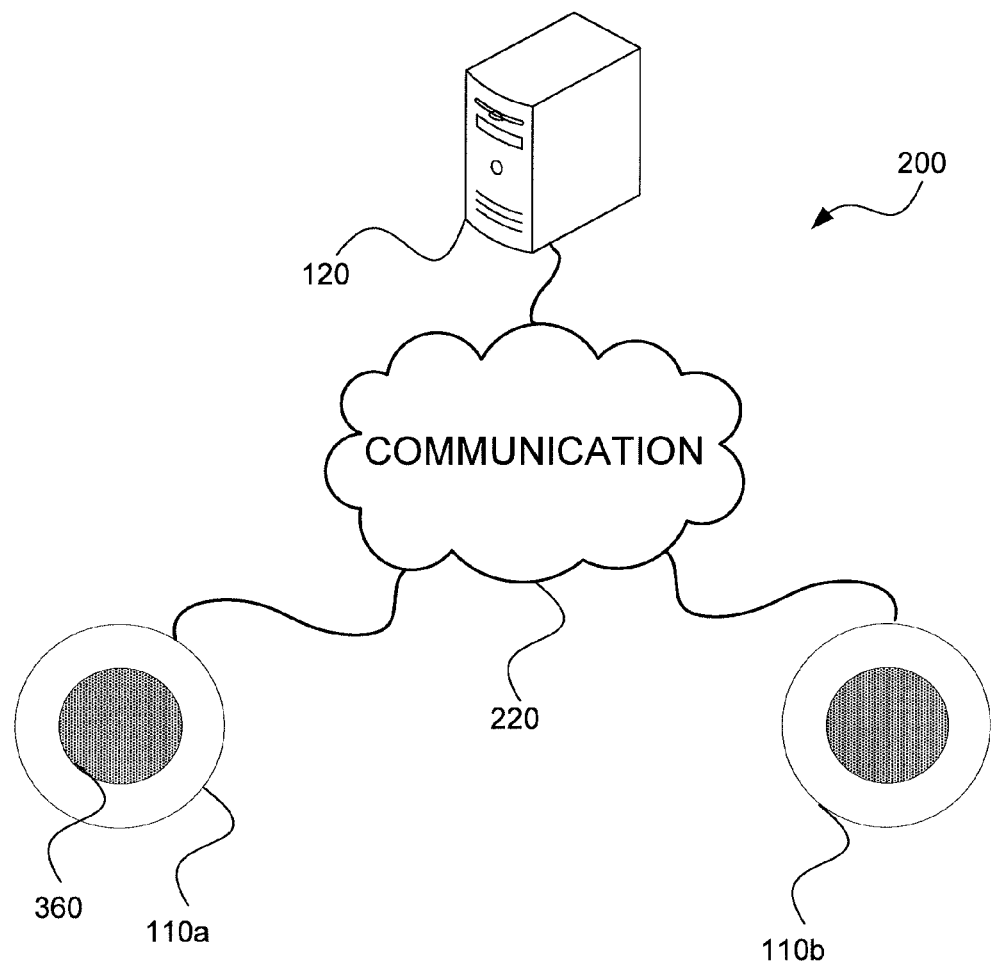
FIG. 5 shows a schematic view of the general structure of a sensor system according to one embodiment.

FIG. 5 shows an example of a sensor system 200. In the example embodiment of the sensor system 200 the sensor system 200 comprises one system server 120 being connected to two sensors 110a and 110b through a communication interface 220. The system server 120 is arranged to receive detection signals 118 from the sensors 110 over the communication interface (which is comprised by the sensors' communication interface 320 and the system server's communication interface 420 as shown in and described in relation to FIGS. 6 and 7), and to determine an appropriate function 126 to be executed and execute the function possibly by contacting a remote service provider such as a care taker service or emergency service. The function 126 may pertain to assistance, attendance, care taking, medical care, emergency service or rescue of a human user.

Figure 6:
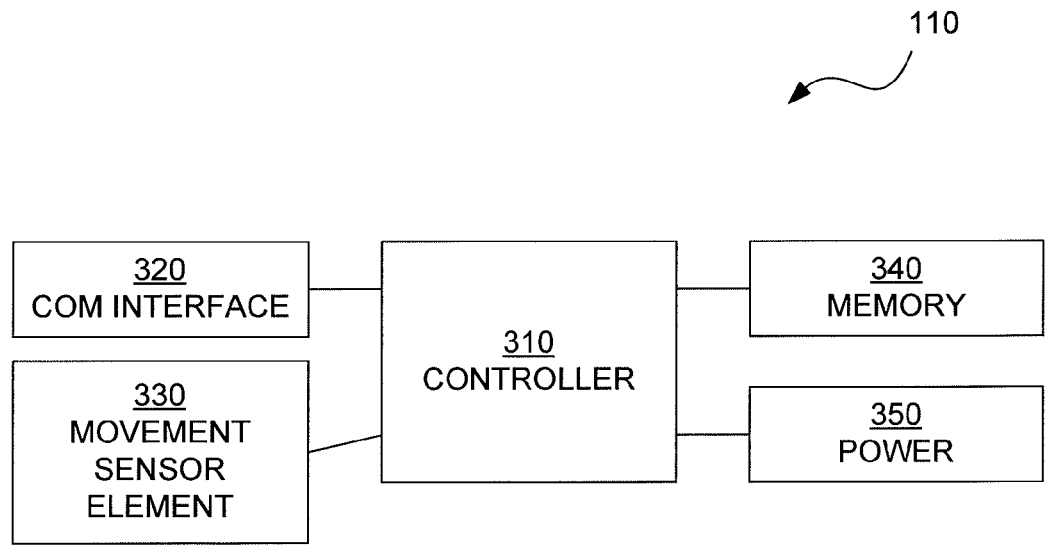
FIG. 6 shows a schematic view of a sensor according to one embodiment.

FIG. 6 shows a schematic overview of a sensor or sensing unit 110. The sensor 110 is an accelerometer-based movement sensor. The sensor 110 thus comprises a movement sensor element 330 which contains an accelerometer and associated movement detection circuiting. As has been discussed above, in one embodiment the system 200 may comprise additional sensors (not shown) of a different or second type. Such second type of sensors may be motion sensors, magnetic sensors, on-person worn sensors or other sensors known in the art. Such second type sensors may be dedicated sensors used for detecting a specific action 116 that the sensor was designed to detect.

The sensor 110 further comprises a controller 310, which may be implemented as one or more processors (CPU) or programmable logic circuits (PLC), which is connected to or comprises a local memory 340. The memory may be implemented using any commonly known technology for computer-readable memories such as ROM, RAM, SRAM, DRAM, CMOS, FLASH, DDR, SDRAM or some other memory technology. The memory 340 is configured to store a definition of the movement pattern for a basic movement to be detected. The sensor 110 also comprises a communication interface 320. The communication interface may be a wireless radio frequency interface such as a Bluetooth™ or a WiFi (IEEE802.11b standard) link. The communication interface 320 may also be a wired interface.

The controller 310 is configured to receive a sensing signal from the movement sensor element 330 and to compare the movement signal to the definition of the movement pattern stored in the memory 340. If the movement signal matches the movement pattern, the basic movement 114 is detected. In response thereto, the controller 310 is configured to activate the communication interface 320 and transmit a detection signal 118.

The sensor 110 may be powered by a power supply 350, such as a battery, a solar cell or other power supply. The power supply 350 may also be movement activated harbouring the needed power from the actual movements that the sensor 110 is subjected to.

In a specific embodiment the sensor is a fall sensor arranged to detect a falling movement. Such sensors exist in the field of sensors and may be utilized in a sensor system according to the teachings herein. Utilizing such sensors is beneficial in that the sensors are cheap and already available. As shown in FIG. 5, the fall sensor 110 may be arranged with a user interface 360 which may be formed by a button that can be pressed to initiate an alarm sequence.

By adjusting the sensitivity of the fall sensor it may be used to detect other movements than a typical human fall accident, as a highly sensitive fall sensor will also react to movements not being falls. This has the benefit that a fall sensor (or other dedicated sensor) may be used without any or limited reprogramming of the sensor.

In another specific and more advanced alternative, the sensor 110 is arranged to detect a movement pattern for the sensor 110 shall later be used to detect. The sensor 110 is configured to register one or more movements of the movable structure 112 to which it is attached, wherein such movement pattern represents the basic movement 114 to be detected. The controller has a configuration mode in which it is adapted to generate a definition of the detected movement pattern and store the generated definition of the movement pattern in the local memory 340, thus creating a predetermined basic movement to be detected. The registering of the movement pattern may be accomplished by recording a number of points along a performed trajectory and vectorizing these points. The registering of the movement pattern may be performed upon an initial start-up of the sensor 110 or upon prompting by the system server 120. Such a sensor brings the benefit that the sensor is highly flexible in that it can be configured to detect any movement, little or small, complex or simple.

Figure 7:
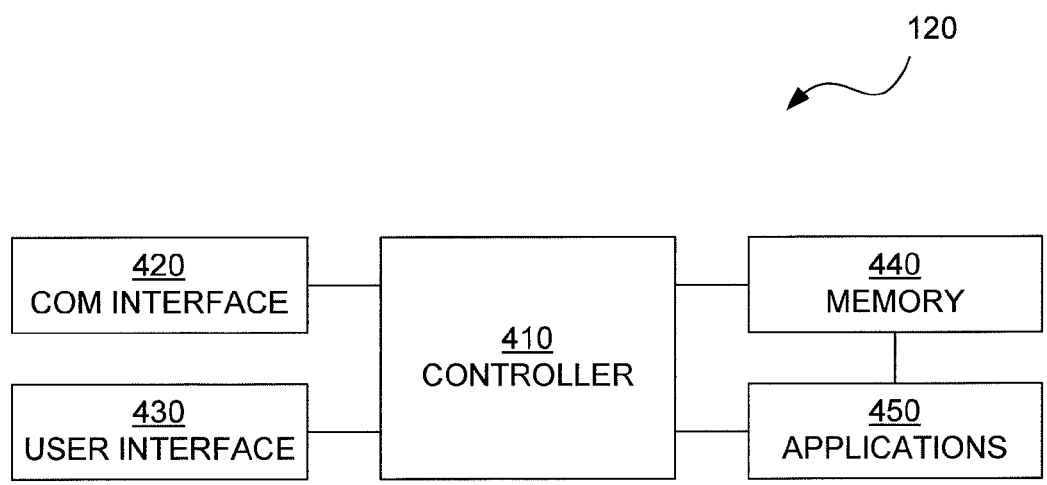
FIG. 7 shows a schematic view of a system server according to one embodiment.

FIG. 7 shows a schematic view of the general structure of a system server 120. The system server may be implemented as a smart phone, a computer, a tablet computer or a dedicated device.

The system server 120 comprises a controller 410. The controller 410 may be implemented using instructions that enable hardware functionality, for example, by using executable computer program instructions in a general-purpose or special-purpose processor that may be stored on a computer readable storage medium (disk, memory etc) 440 to be executed by such a processor. The controller 410 is configured to read instructions from the memory 440 and execute these instructions to control the operation of the system server 120.

The system server 120 may be arranged to store an identifier for a sensor 110 so that the system server may determine which sensor a detection signal is received from and determine which action should be taken in response thereto.

The memory may be implemented using any commonly known technology for computer-readable memories such as ROM, RAM, SRAM, DRAM, CMOS, FLASH, DDR, SDRAM or some other memory technology.

The system server 120 further comprises one or more applications 450. The applications are set of instructions that when executed by the controller 410 control the operation of the system server 120. The applications 450 may be stored on the memory 440.

The system server 120 may further comprise a user interface 430, which may comprise a display (not shown) and a number of keys (not shown).

The system server 120 further comprises a communication interface 420, such as a radio frequency interface 420, which is adapted to allow the system server 120 to communicate with at least one sensor 110 and also other devices, such as a remote service provider server through a radio frequency band and different radio frequency technologies.

Examples of such technologies are W-CDMA, GSM, UTRAN, LTE, and NMT to name a few. The communication interface 420 may be arranged to communicate with the sensors 110 using one technology (for example, Bluetooth or WiFi or even a wired interface) and with other devices such as a remote service provider server through for example LTE or through an internet protocol.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 8:
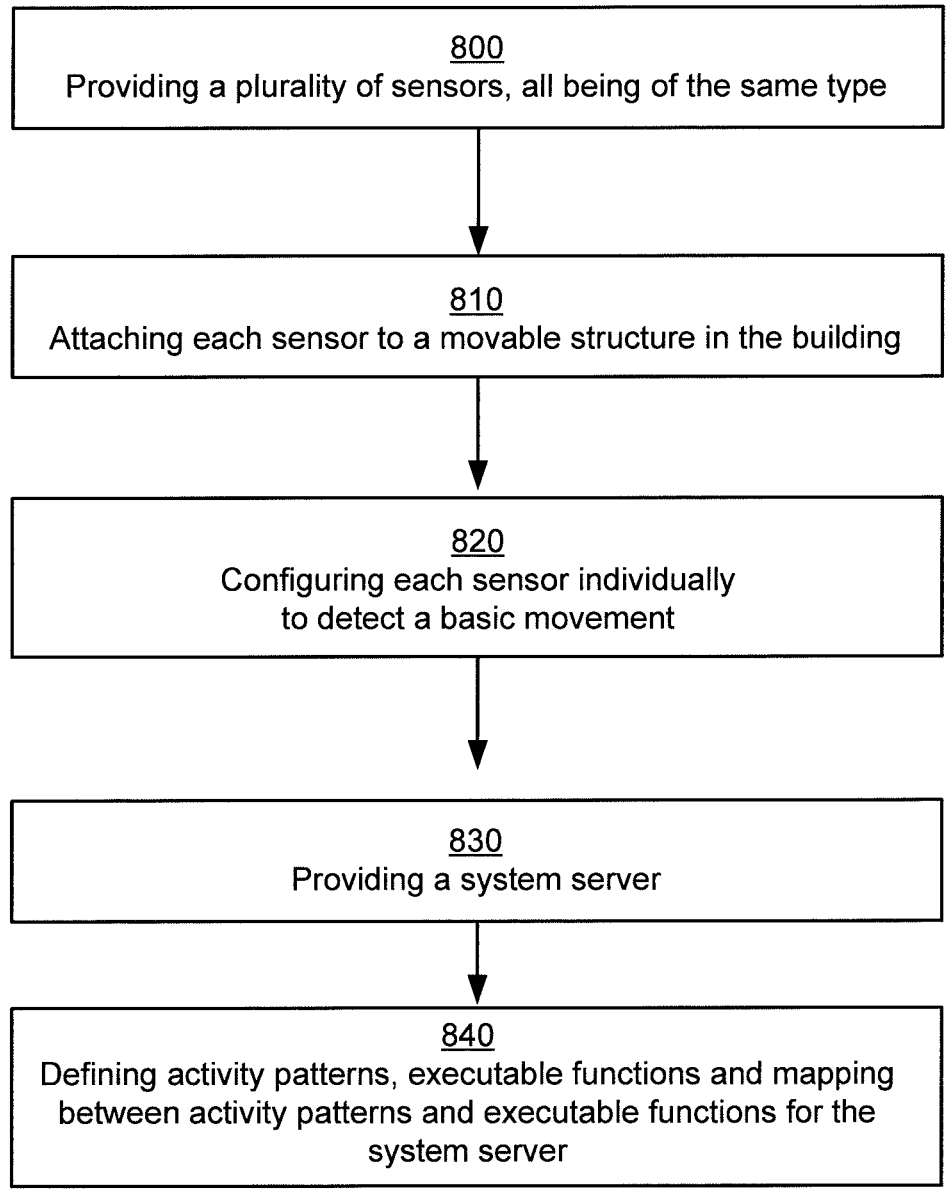
FIG. 8 shows a flowchart of a method according to one embodiment.

FIG. 8 shows a flowchart of a method of configuring a sensor system for behavioural monitoring of a user in a building according to one embodiment. The method involves providing, 800, a plurality of sensors 110, all being of a same accelerometer-based sensor type. Each of the plurality of sensors 110 is attached, 810, to a respective movable structure 112 in a building and configured, 820, individually to detect a respective basic movement 114 of the movable structure 112. The basic movement 114 is indicative of a human behavioural action 116 in the building.

As previously described, a system server 120 is provided, 830, and a plurality of activity patterns 124 is defined, 840, for the system server. Each activity pattern 124 is based on a detection signal 118 from one or more of said plurality of sensors 110, and a plurality of executable functions 126. The executable function may pertain to assistance, attendance, care taking, medical care, emergency service or rescue of a human user in the building. The system server 120 also defines a mapping 128 between activity patterns 124 and executable functions 126, as previously described.

Figure 9:
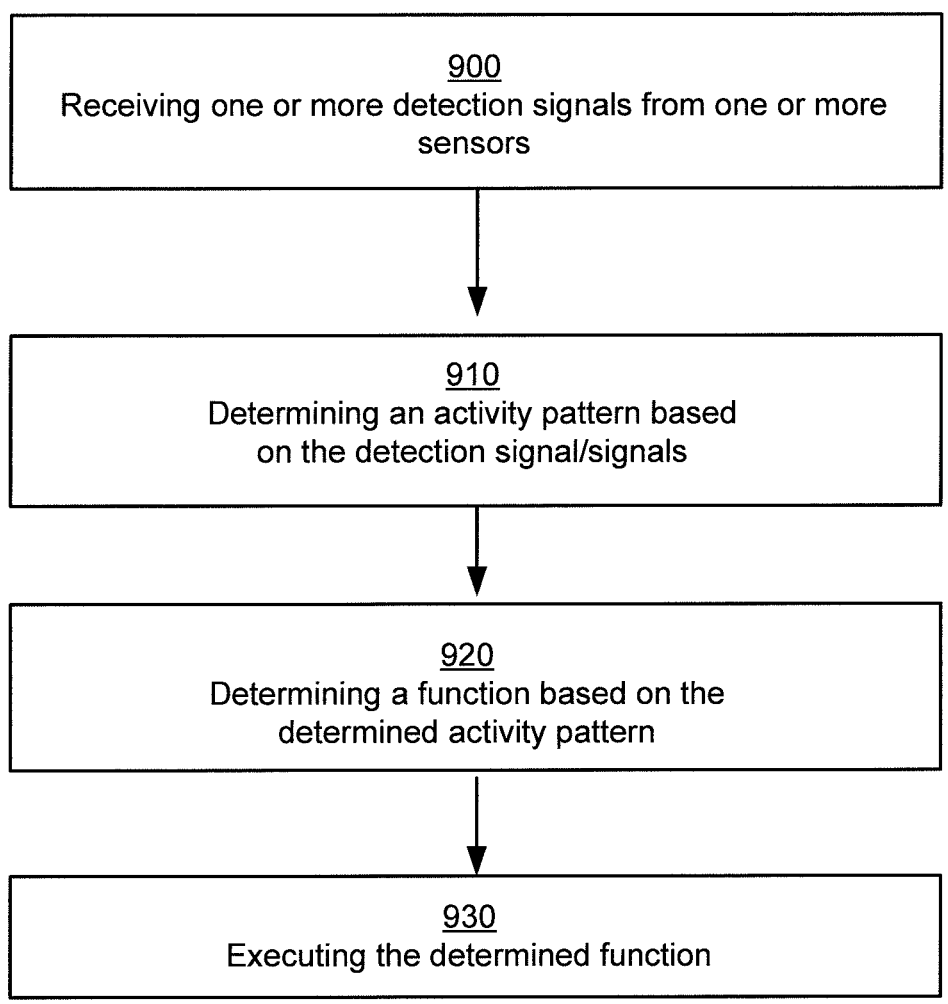
FIG. 9 shows a flowchart of a method according to one embodiment.

FIG. 9 shows a flowchart of a method of behavioural monitoring of a user in a building using a sensor system according to one embodiment. The system server 120 receives at 900 one or more detection signals 118 from one or more of said plurality of sensors 110. Based on said detection signal 118 or detection signals 118, the activity pattern 124 is determined at 910 among the plurality of activity patterns 124. Based on the determined activity pattern 124, the appropriate function is determined at 920 among said plurality of executable functions. The determined function is then executed at 930.

One benefit of the teachings herein is that an advanced sensor system is enabled using simple sensors that are of the same type—or at least taken from a small group of different subtypes of sensors (the subtypes may be relate to different sizes or different sensitivities)—which are easy to install or mount and which, when combined in a clever manner, combine to provide advanced monitoring through indirect (and direct) detection of human behavioural actions.

The invention has mainly been described above with reference to a few embodiments. However, as is readily appreciated by a person skilled in the art, other embodiments than the ones disclosed above are equally possible within the scope of the invention, as defined by the appended patent claims.

In one such alternative embodiment, a sensor system is provided which comprises a plurality of sensors and a system server, wherein each of said sensors is arranged to detect a basic movement and to communicate with said system server in response to detecting the basic movement. The system server is configured to receive a detection signal from a sensor, determine a pattern based on said detection signal, determine an appropriate function based on said pattern, and execute said function, wherein said plurality of sensors is of a same movement sensor type, whereby the system is configured to indirectly detect an action by detecting an associated movement.

In one such alternative embodiment, the system server is configured to maintain a record or register over said plurality of sensors and associated functions to be executed and to base the determination of the appropriate function on said register.

In one such alternative embodiment, the pattern is a single, specific sensor detection signal.

In one such alternative embodiment, the system server is configured to combine sensor signals to determine said pattern.

In one such alternative embodiment, the system server is configured to determine said pattern based on a timing of said detection signal.

In one such alternative embodiment, the system server is configured to determine a priority of an appropriate function and execute said appropriate function according to the determined priority.

In one such alternative embodiment, the sensor is configured to store a movement pattern for a basic movement to be detected.

In one such alternative embodiment, at least one of plurality of sensors is enabled to adjust its sensing to a set sensitivity.

In one such alternative embodiment, each of said plurality of sensors is an accelerometer-based movement sensor.

In one such alternative embodiment, each of said plurality of sensors is a fall sensor.

In one such alternative embodiment, each of said plurality of sensors is configured to detect and store a basic movement pattern representing a basic movement to be detected.

In one such alternative embodiment, the sensor system further comprises at least one second sensor being of a different type.

The invention claimed is:

1. A sensor system comprising a plurality of sensors and a system server, all of said plurality of sensors being of a same accelerometer-based sensor type, each of said plurality of sensors being adapted for attachment to any one of different movable structure in a building, each of said plurality of sensors being individually configured to detect a respective basic movement of said movable structure, said basic movement being indicative of a human behavioural action in said building, wherein each of said sensors is arranged to:

detect its basic movement; and communicate with said system server in response to detecting the basic movement, and wherein the system server is configured to:

receive a detection signal from any of said plurality of sensors; determine an activity pattern based on said detection signal;

determine an appropriate function based on said activity pattern; and execute said function.

2. The sensor system according to claim 1, wherein said system server is configured to maintain a record or register over said plurality of sensors and associated functions to be executed and to base the determination of the appropriate function on said record or register.

3. The sensor system according to claim 1, wherein said activity pattern is based on a single detection signal from a specific sensor among said plurality of sensors.

4. The sensor system according to claim 1, wherein said system server is configured to combine detection signals from two or more sensors among said plurality of sensors to determine said activity pattern.

5. The sensor system according to claim 1, wherein said system server is configured to determine said activity pattern based on a timing of said detection signal or combination of detection signals.

6. The sensor system according to claim 1, wherein said system server is configured to determine the severity of an activity pattern and prioritise which appropriate function that based on the priority should be executed.

7. The sensor system according to claim 1, wherein each of said plurality of sensors is configured to store a definition of a movement pattern for the basic movement to be detected.

8. The sensor system according to claim 1, wherein each of said plurality of sensors is a fall sensor.

9. The sensor system according to claim 1, wherein at least one of said plurality of said sensors is enabled to adjust its sensing to a set sensitivity.

10. The sensor system according to claim 1, each of said plurality of sensors having a controller and a local memory, and a configuration mode in which the controller:
 detects a movement pattern of the movable structure to which it is attached;
generates a definition of the detected movement pattern; and stores the generated definition in the local memory.

11. The sensor system according to claim 1, further comprising, in addition to said plurality of sensors, at least one second-type sensor being different from said plurality of sensors, wherein said system server is configured to receive a detection signal from said second-type sensor and to use it when determining said appropriate function.

12. The sensor system according to claim 1, wherein the movable structure is selected from: a door, a window, a lever, remote control, a pill organiser, a drawer, a hatch.

13. The sensor system according to claim 1, wherein the function pertains to assistance, attendance, care taking, medical care, emergency service or rescue of a human user in said building.

14. A method of configuring a sensor system for behavioural monitoring of a user in a building, the method comprising:
 providing a plurality of sensors, all of said plurality of sensors being of a same accelerometer-based sensor type;
 attaching each of said plurality of sensors to any one of different movable structure in said building;
 configuring each of said plurality of sensors individually to detect a respective basic movement of said movable structure, said basic movement being indicative of a human behavioural action in said building;
 providing a system server; and
 defining for said system server:
  a plurality of activity patterns, each activity pattern being based on a detection signal from one or more of said plurality of sensors;
  a plurality of executable functions, each function pertaining to assistance, attendance, care taking, medical care, emergency service or rescue of a human user in said building; and
  a mapping between activity patterns and executable functions.

15. A method of behavioural monitoring of a user in a building using a sensor system having been configured by the method according to claim 14, the method comprising:
 receiving, by the system server, one or more detection signals from one or more of said plurality of sensors;
 determining an activity pattern among said plurality of activity patterns based on said detection signal or detection signals;
 determining an appropriate function among said plurality of executable functions based on the determined activity pattern; and
executing the determined appropriate function.

* * * * *